Patented Dec. 1, 1942

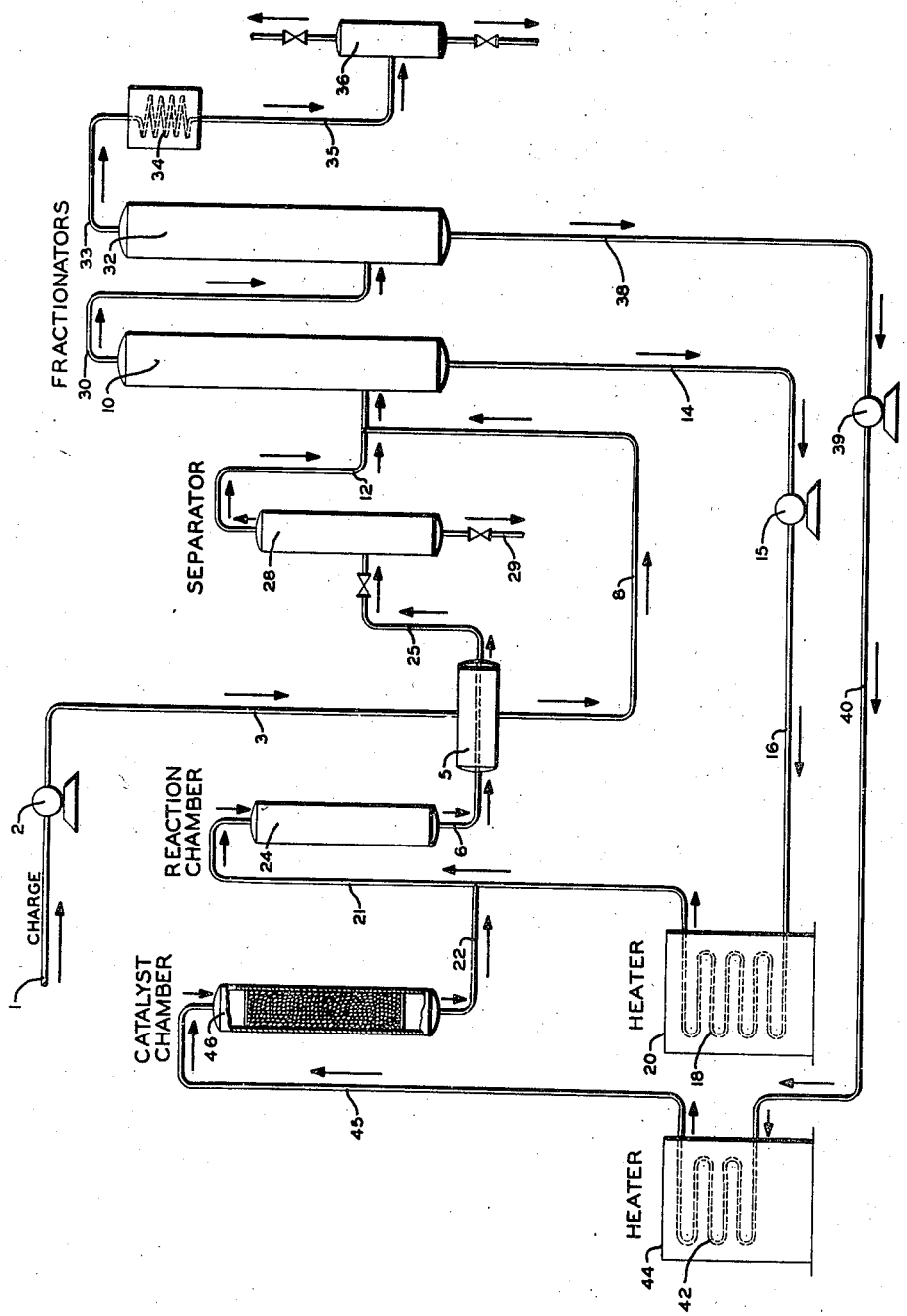

2,303,944

UNITED STATES PATENT OFFICE 2,303,944

CONVERSION OF HYDROCARBON OILS

Theodore A. Mangelsdorf, Port Arthur, Tex., assignor, by mesne assignments, to The Texas Company, a corporation of Delaware Application September 16, 1939, Serial No. 295,171

4 Claims. (Cl. 196—48)

This invention relates to the conversion of hydrocarbon oils and has to do particularly with the cracking of higher boiling oils into lower boiling products for the manufacture of high antiknock gasoline.

The invention includes several new and useful improvements in the art which may be used separately, or in combination. While these improvements are particularly adapted for use in a combination operation, they are intended to have broader application, as will appear from the following description.

The invention comprises improvements in a catalytic cracking operation, whereby an oil is subjected to catalytic cracking and the resulting products are subjected to thermal soaking or reaction. The thermal soaking of the reaction products from the catalytic conversion operation is intended to effect improvements in the yield and quality of the final product. While the reactions taking place in the soaking operation are not definitely known, such reaction may include polymerization of olefins which occur in relatively large amounts in the gases produced in the catalytic cracking. Also other reactions of the nature of gas reversion, for example, interaction between the olefinic gases and heavy oils may occur. Furthermore, additional conversion into low boiling products may take place in the soaking operation, whereby the yield is appreciably increased. In such a process it is possible to operate at a low crack per pass and high recycle ratio in the catalytic cracking operation, whereby the life of the catalyst is increased and yet a high ultimate yield obtained as a result of the additional conversion in the soaking operation.

Another feature of the invention includes the combination of thermal and catalytic cracking, wherein individual charging stocks are subjected to separate catalytic and thermal cracking, the reaction products combined and the mixture subjected to thermal reaction or soaking. The advantages, pointed out above, may be realized in this type of operation, and certain of the reactions accentuated, due to the presence of the thermally cracked products. In this type of operation there is considerable conservation of heat due to the use of sensible heat in the cracked products for promoting reaction in the soaking zone. Furthermore, in this type of operation, substantial improvement in yield and octane, as compared to thermal cracking, is obtained. While it is to be expected that the product obtained would be approximately an average of those produced by catalytic and thermal cracking, it may be possible to approach the results obtained by catalytic cracking.

The invention is particularly applicable to a clean recycle type of operation wherein a charging stock is subjected to a thermal cracking operation, the products separated into vapors and residue, the vapors fractionated to form higher boiling and lower boiling recycle stocks, the higher boiling recycle stock charged to a thermal cracking operation, the lower boiling recycle stock subjected to catalytic cracking, the products from the catalytic cracking operation combined with those from the thermal cracking operation and the mixture subjected to a soaking operation.

The invention will be more fully understood from the following description read in connection with the accompanying drawing, which shows one form of apparatus for practicing the process of the invention.

Referring to the drawing, a charging stock, which may be crude oil, reduced crude, gas oil, or any other suitable cracking stock, is introduced through the line 1 and forced by the pump 2 through the line 3 to a heat exchanger 5 wherein the charging stock is preheated by indirect heat exchange with cracked products passing through the line 6. The preheated oil is then conducted through the line 8 to a fractionator 10 wherein it is commingled with cracked vapors from the line 12, either before or after entering the fractionator. In the fractionator the charging stock is partially vaporized by the heat of the cracked vapors and simultaneously the higher boiling constituents of the vapors are condensed to form a mixture of reflux condensate and unvaporized fresh charge which is collected in the lower portion of the fractionator. The mixture of unvaporized charge and reflux condensate is withdrawn from the lower portion of the fractionator 10 through the line 14 and forced by the pump 15 through the line 16 to a heating coil 18 located in a furnace 20. In passing through the heater the oil is subjected to temperatures of about 940° to 960° F. and pressures of about 200 to 250 pounds. A conversion of about 10 to 12% per pass is obtained in the heating coil. The products are transferred from the heating coil through the line 21 to a reaction chamber 24, wherein they are commingled with the catalytically cracked hydrocarbons from the line 22 and the mixture subjected to soaking in the reaction chamber 24. The reaction chamber may be maintained at temperatures of about 900° F. and under sufficient pressure to maintain about 5 to 10% of liquids therein, for example about 200 pounds. The reaction products pass from the reaction chamber through the line 6, heat exchanger 5 and line 25 to a separator or flash chamber 28, wherein separation of vapors occurs. Fuel oil is withdrawn from the bottom of the separator through the line 29. If it is desired to run to coke instead of fuel oil, the reaction chamber may be replaced by a coke drum or a coke drum may be installed following the reaction chamber. Vapors are taken overhead from the separator through the line 12 to the fractionator 10, referred to heretofore. Vapors from the fractionator 10 pass overhead through the line 30 to a secondary fractionator 32. In the latter fractionator products of higher boiling point than gasoline are condensed as a reflux condensate while the lighter gases and vapors are passed overhead through the line 33 to a condenser 34 wherein a gasoline condensate is formed. The condensate is passed through the run-down line 35 to the receiver 36. A super clean distillate recycle stock is withdrawn from the bottom of the fractionator 32 through the line 38 and forced by the pump 39 through the line 40 to a heating coil 42 located in a furnace 44. In the heater the oil is subjected to temperature and pressure conditions sufficiently high whereby on transferring the hot products through the line 45 to the catalyst chamber 46, a temperature of about 875° to 920° F. and about 200 pounds pressure are maintained therein. It is preferable to operate the catalyst chamber whereby about 15 to 25% conversion per pass occurs. The catalyst may be any conventional solid contact cracking catalyst, such as active natural or acid treated clays, synthetic clays, acid treated zeolites, silica gel, or a synthetic silica-alumina compound. While only one catalyst chamber is shown, it is to be understood that two or more may be used, arranged so that one chamber may be on stream while the other is undergoing regeneration.

As an example of the operation of the invention, a reduced crude of about 26° A. P. I. gravity is preheated to about 400° F. and discharged into a primary fractionating tower receiving cracked vapors. The fractionating tower is maintained under a pressure of about 35 pounds and a bottom temperature of about 650° F. A black oil comprising unvaporized charge and reflux condensate, having a gravity of about 14° A. P. I. is withdrawn from the bottom of the fractionator and heated to about 950° F. under about 250 pounds pressure. The hot products are transferred to a reaction chamber maintained at about 880° F. and 200 pounds pressure. The products from the reaction chamber are discharged into a flash chamber, maintained under about 40 pounds pressure and 700° F., from which a fuel oil of about 8° A. P. I. gravity and 100 viscosity at 122° F. furol, is withdrawn. The vapors from the flash chamber are conducted to the primary fractionator. The uncondensed vapors from the primary fractionator are passed to a secondary fractionator maintained under about 30 pounds pressure and a bottom temperature of about 600° F. A clean recycle stock of about 22° to 24° A. P. I. gravity is withdrawn from the bottom of the secondary fractionator and passed through a heater wherein the oil is raised to a temperature of about 960° F. under 200 pounds pressure. The hot products are passed through a catalyst chamber containing a synthetic silica-alumina catalyst. The products from the catalyst chamber are discharged into the reaction chamber. The overhead vapors from the secondary fractionator are condensed and a stabilized gasoline of 400 end point, having an octane number of 78 (C. F. R. M.) is recovered. The yield is about 60% gasoline, 32% fuel oil and 12% gas.

In a straight thermal cracking operation, carried out under substantially the conditions as described in the above example, the yields are about 54% gasoline, 36% fuel oil and 14% gas. The octane number of the gasoline in this case is about 68.

Obviously many modifications and variations of the invention, as hereinbefore set forth, may be made without departing from the spirit and scope thereof, and therefore only such limitations should be imposed as are indicated in the appended claims.

I claim:

1. In the manufacture of high antiknock gasoline, the process that comprises subjecting one oil to catalytic cracking at a temperature of about 875° F.–920° F. in the presence of a solid contact catalyst adapted to promote conversion into lower boiling hydrocarbons of the gasoline boiling range and at high anti-knock quality, separating the resultant products of the catalytic cracking from the catalyst, simultaneously subjecting another oil to thermal cracking to effect conversion into lower boiling hydrocarbons without the aid of a catalyst, and combining the separated products from the catalytic cracking with the resultant products from the thermal cracking and maintaining the mixture in a reaction zone, in the absence of a catalyst, under conversion conditions of temperature and pressure adapted to effect further conversion into hydrocarbons of the gasoline boiling range.

2. In the manufacture of high antiknock gasoline, the process that comprises subjecting a condensate stock to catalytic cracking at a temperature of about 875° F.–920° F. in the presence of a solid contact catalyst adapted to promote conversion into lower boiling hydrocarbons of the gasoline boiling range and of high antiknock quality, simultaneously subjecting another stock comprising residual constituents to thermal cracking to effect conversion into lower boiling hydrocarbons without the aid of a catalyst, and combining the hot products from the catalytic and thermal cracking operations and maintaining the resultant mixture in a reaction zone, in the absence of a catalyst, at a temperature of the order of 900° F. to effect further conversion into hydrocarbons of the gasoline boiling range.

3. In the manufacture of high antiknock gasoline, the process that comprises subjecting a condensate stock to catalytic cracking in the presence of a solid contact catalyst adapted to promote conversion into lower boiling hydrocarbons of the gasoline boiling range and of high antiknock quality, simultaneously subjecting another stock comprising residual constituents to thermal cracking to effect conversion into lower boiling hydrocarbons without the aid of a catalyst, and combining the hot products from the catalytic and thermal cracking operations and maintaining the resultant mixture in a reaction zone, in the absence of a catalyst, at a temperature of the order of 900° F. to effect further conversion into hydrocarbons of the gasoline boiling range.

4. In the manufacture of high antiknock gasoline, the process that comprises subjecting hydrocarbon oil to catalytic cracking in a catalytic cracking zone in the presence of a solid contact catalyst adapted to promote conversion into lower boiling hydrocarbons of the gasoline boiling range and of high antiknock quality, simultaneously subjecting another stock to thermal cracking in a thermal cracking zone to effect conversion into lower boiling hydrocarbons without the aid of a catalyst, combining the hot products from the catalytic and thermal cracking operations and maintaining the resultant mixture in a reaction zone, in the absence of a catalyst, at a temperature of the order of 900° F. to effect further conversion into hydrocarbons of the gasoline boiling range, separating the resultant cracked products into vapors and residue, commingling the separated vapors with charging stock to effect condensation of a portion of the vapors, directing the resultant mixture of condensate and unvaporized charging stock to the thermal cracking zone, subjecting the uncondensed vapors to further fractionation to separate a reflux condensate from lighter products and directing said reflux condensate to the catalytic cracking zone.

THEODORE A. MANGELSDORF.